United States Patent Office 3,328,731
Patented June 27, 1967

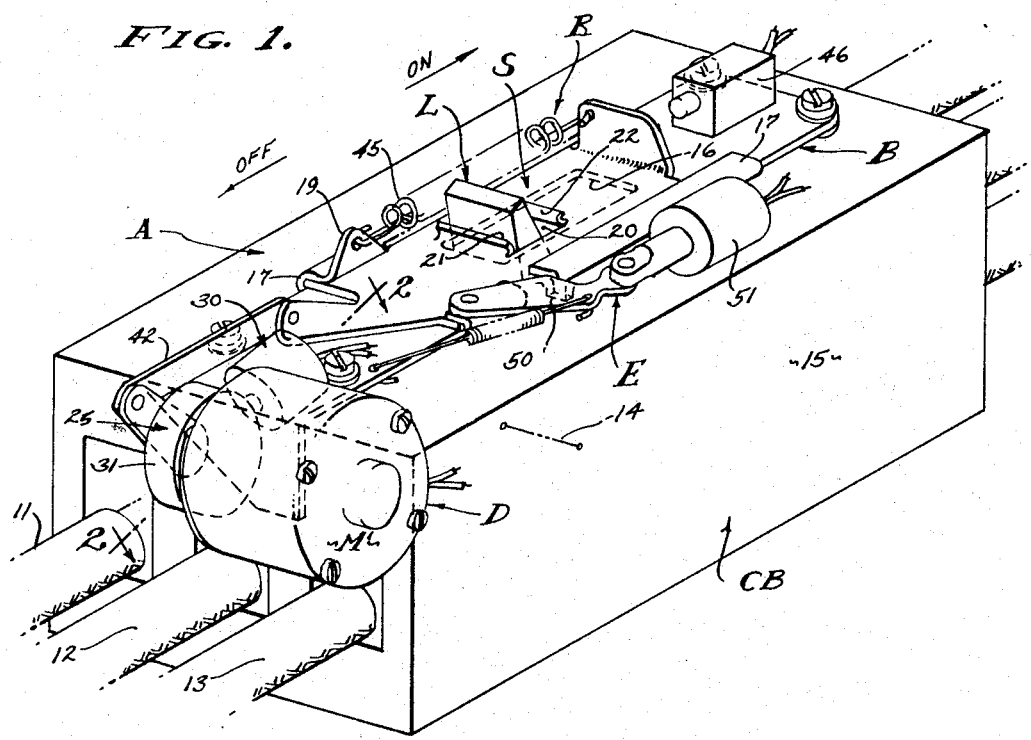

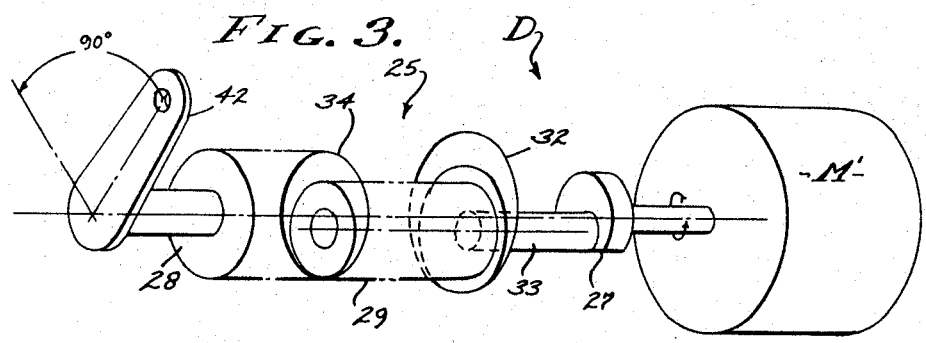
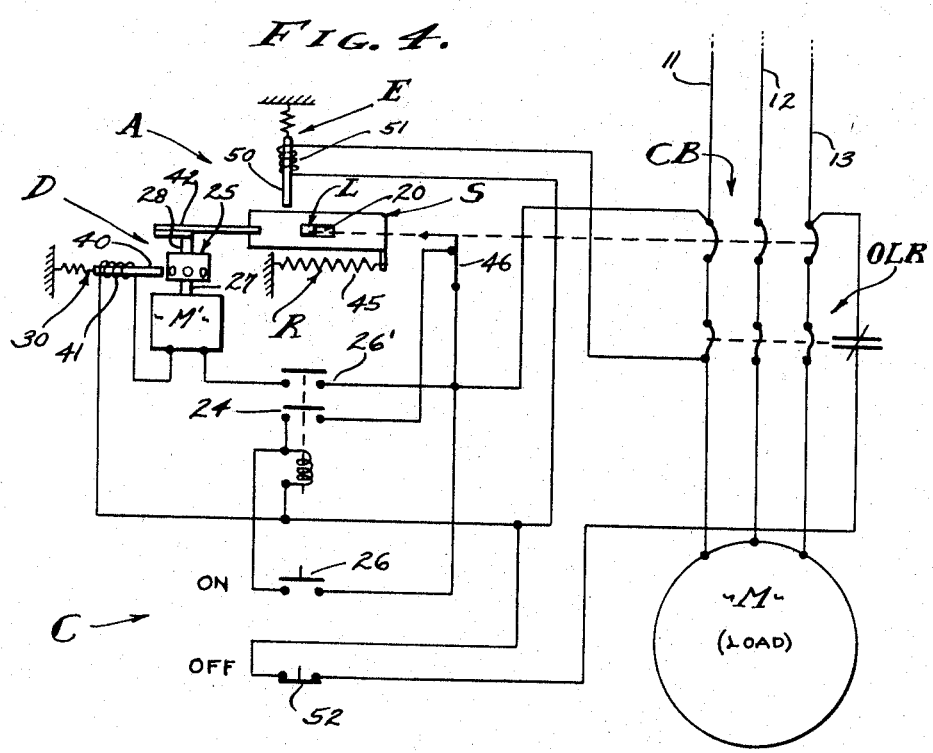

3,328,731
COMBINED ELECTRICAL CIRCUIT BREAKER
AND ACTUATOR
Paul Huska, Los Angeles, Calif.
(1150 18th St., Santa Monica, Calif. 90403)
Filed June 14, 1965, Ser. No. 463,729
6 Claims. (Cl. 335—74)

This invention relates to electrical power control and has to do with a switch adapted to act both as an electrical contactor and as a circuit breaker, it being a general object of this invention to provide actuation for a switch to close and to open the same both selectively as desired and protectively as determined by circuit conditions.

Electrical power is the primary matter of concern herein, and it is known generally that electrical power must be handled with caution. Therefore, the art of electrical power control becomes quite involved and usually requires three basic electrical devices, 1 a circuit breaker, 2 an electrical contactor and 3 an overload relay. The circuit breaker 1 is a protective device adapted to remain normally closed and to open a circuit when faulty conditions occur, usually being a quick make and quick break switch designed for limited cycles of operation. The electrical contactor 2 is a controlling device adapted to selectively open and close a circuit as desired, usually being a quick make and quick break switch designed for extensive cycles of operation. And, the overload relay 3 is a protective device adapted to remain normally closed and to open a circuit when subjected to overload of lengthy duration. These three devices are usual requirements, for example, in a motor controlling circuit and where large motors are involved this threefold switching involves a heavy installation of the said three normally accepted switches, all with comparable and attendant wiring and protective enclosures.

Concerning motor control circuits and the like, starting and stopping requirements vary, and in many instances a motor installation will not require continuously repeated starting and stopping. Therefore, the usual electrical contactor 2 is not always used as designed for extensive cycles of operation, and is in many such instances a waste of equipment in that it is not used for the purpose intended. Furthermore, in those installations where protective measures require enclosure and/or remote operation of contactors, then such contactors are installed regardless of their non-use, simply because they are or lend themselves to be actuated by magnetic or servo controls. As a result, there are many instances where controllers are installed and never employed as such, just for the purpose for example of starting a continuously operable motor or like equipment.

Concerning circuit breakers 1 per se, such devices though they are not primarily intended for continuously repeated cycles of use, nevertheless they are so well constructed as to last and to operate efficiently through thousands of operating cycles. So, in accordance with this invention it is an object to advantageously employ the attributes and properties normally built into such a circuit breaker, to close and to open a power circuit when frequent cycling is not required. In other words, when infrequent starting and stopping prevails, I eliminate the entire electrical contactor with its attendant controls and wiring, and I substitute therefor an actuator that operates a circuit breaker so as to function as a start and stop switching device. The overload relay 3 can remain as usual and the wiring of the circuit breaker 1 is direct to the load without the usual intervening series switches of a contactor 2. Thus, the electrical circuit controller of the present invention is characterized by the circuit breaker per se, and it includes the overload relay as and when required.

With the foregoing problem in mind the utility of the circuit breaker actuator that I provide will be understood, it being an object of this invention to provide an actuator that operates a circuit breaker in a manner that makes it serviceable as a start and stop switch, in place of and thereby eliminating an electrical contactor.

Another object of this invention is to provide a circuit breaker and start and stop switch that is fail safe, in that the same is driven to an ON position from which it automatically opens when there is a power failure or power interruption.

It is another object of this invention to provide an actuator with a motor and transmission to drive the same to an operative position in which it is locked and from which it is releasable selectively and/or upon power failure or interruption of power in the circuit being controlled.

It is still another object of this invention to provide an actuator of the character referred to that governs the movement of an operating lever on a usual circuit breaker, to shift the same between two extreme angular positions, a closed ON position and an open OFF position.

And, it is also an object of this invention to provide an actuator for a switch, such as a circuit breaker of the character referred to, that does not unnecessarily encumber the same and which thereby permits the usually accepted installation of the switch, for instance so as to be releasably and operably coupled to the handle of a closure. That is, the front and usually accessible face of the switch remains usable as it is normally employed.

The various objects and features of this invention will be fully understood from the following detailed description of the typical preferred form and application thereof, throughout which description reference is made to the accompanying drawings, in which:

FIG. 1 is a perspective view showing a practical application of the present invention, illustrating the actuator of the present invention attached to a circuit breaker switch.

FIG. 2 is an enlarged detailed view taken substantially as indicated by line 2—2 on FIG. 1, showing the preferred transmission drive in section.

FIG. 3 is an expanded oblique view of the elements which comprise the said transmission drive.

And, FIG. 4 is an electrical diagram employed in carrying out the installation as shown throughout the drawings.

In the drawings I have shown a typical electrical circuit as applied in the present instance to power an electric motor M. The power circuitry shown is a three phase installation involving power lines 11, 12 and 13 and each of which has a circuit breaker CB therein for opening and closing the line. As shown, the usual overload relays OLR are in series in each line, there being the conspicuous absence of electrical contactors as such. However, in conjunction with the circuit breakers there is an actuator A that is cooperatively related thereto so as to operate the same as a selective switching device in addition to its originally intended primary function as a circuit protective device. That is, the circuit breakers CB are not only operable as responsive to electrical fault conditions but are also operable as responsive to selective control as is required for starting and stopping operation of the motor M.

The circuit breakers CB are incorporated in a single unit of construction and positioned by a single lever L that opens and closes them in unison or together. Basically, the circuit breakers have an ON position and an OFF position, and also a tripped position, and it is to these two basic ON and OFF positions that the lever L operates, either by means of the application of exterior force or by the application of electrical force within the device. The circuit breaker shown in the drawings involves a box shaped frame 15 onto which the actuator A of the present invention is adapted, and it involves the usual mechanisms which automatically throw the lever L to an intermediate tripped position upon the occurrence of electrical fault conditions. The circuit breaker mechanisms can vary widely and forms no part of the present invention, but it is essential to the present invention that there be the lever L or equivalent element that is shiftable to two extreme positions, for example the ON position and the OFF position. As is illustrated, the lever L is in this instance shiftable by being pivoted at 14 so that it revolves to the two positions shown. Characteristically, the circuit breaker mechanism is analogous to a snap switch and has an over-center snapping action. That is, upon the lever L reaching an intermediate position, when moved from either extreme position, the interior mechanism throws the switch contacts ahead of and independently of the lever motion. Following this, the lever L need not be driven by external forces to the full distance of its travel, and will spring of its own accord to either extreme position in order to follow the corresponding movement of the switch contacts.

In accordance with the invention, the actuator A is an attachment that is applied to a circuit breaker CB with or without modification to the same. Generally, the actuator A involves an adaptor B, a slide S, a drive means D, a return means R, a releasable lock means E and a control means C. The above said means are correlated in a mechanism which can take various forms and in the case illustrated the actuator A is simply super-imposed upon the exterior of the circuit breaker CB, it being understood that it can be adapted over the front and to the side of the circuit breaker frame 15. As shown, the adaptor B fastens to the front of the frame 15 and the slide S is reciprocably superimposed on the frame so as to engage with and to move the lever L toward its two opposite ON and OFF positions. The drive means D is operable to shift the slide toward the ON position while the return means R is operable to shift the slide toward the OFF position. Said means D and R are arranged on and carried by the adaptor B and the releasable lock means E is associated with the two means D and R to hold the slide S in an advanced ON position and to be actuated so as to release the slide S so that it is operated upon by the means R to be driven reversely to the OFF position.

The adaptor B that carries the other elements of the actuator A is essentially a flat plate that is fastened onto the front face of frame 15 in the form of a guide for the slide S and with brackets for the support of the other means involved. Since it is the lever L which is to be controlled, the adaptor B is engaged over and at or around the lever L, having an opening 16 to freely pass and to permit movement of said lever. In carrying out the invention, the adaptor B has spaced rails 17 to guide the slide S in the direction of the revolvement or shifting of the lever L, a mounting 18 for the drive D and a seat 19 for the return means R. Other facilities are included in the adaptor as will be described.

The slide S that moves reciprocably toward the two extreme ON and OFF positions of the circuit breaker lever L is a flat elongate element that is captured in and to slide within the rails 17. The slide S is also a flat plate-like part that has a slot-shaped opening 20 therein to overlie the above said opening 16 and to receive the lever L which extends therethrough. As shown, the opening 20 has rounded ends 21 and 22 for bearing engagement with the opposite sides of the lever L. Further, the said ends 21 and 22 are so spaced as to permit free movement of the lever L to extreme ON or OFF positions when said lever snaps by the above mentioned over-center positions. Thus, the slide S bears against the lever L to move it by the said over-center positions, after which the lever L is free to continue on its own to the extreme position toward which it has been urged from the opposite extreme position.

The drive means D that shifts the slide S toward the ON position is primarily a motor means and that is coupled to the slide in order to urge the slide to the ON position selectively as and when required. The drive means D can vary in form and is preferably a relatively small fractional horsepower motor M that is geared to the slide S through a gear train or transmission drive 25. Although it is possible to drive the slide S in but one direction and to permit the return motion of the slide S to reverse movement in the gear train 25 and motor M, it is preferred that the drive means D be releasable. Therefore, the drive means D is shown as a releasable motor drive involving the motor M, the transmission drive 25 and a clutch 30 that engages the drive to advance the slide S. The power lines 11, 12 and 13 are often high voltage lines and it is feasible to employ comparable high voltage elements in the motor M and clutch 30 which is electrically operated. As shown, the motor M and clutch 30 are in a series circuit across two of the power lines (11 and 13) and under control of an ON switch 26. Thus, when the motor M is energized the clutch 30 is also energized, and when the two are de-energized the clutch disengages the slide S from the motor M.

The ON switch 26 is essentially a "start" switch and is adapted to be manually controlled. Therefore, it is in the form of a push-button switch that is normally open, and since continuance of the motor operation is to be desired, a holding switch 24 is placed in parallel with the start switch contacts. Said holding switch can be closed contacts that are opened when the slide S reaches each fully extended, ON and also OFF position. As shown, the ON switch 26 energizes a relay to close a switch 26' and the holding switch 24 is incorporated in said relay coil circuit that is opened by actuation of a limit switch 46 upon full movement of the slide S to the ON position.

In accordance with the invention the motor M can be any motor that is adapted to drive in one direction as indicated, while the transmission 25 is specialized. Specifically, the gear train 25 is a transmission drive that turns a driven shaft at a different rate than the turning of a drive shaft only when the frame or case thereof is anchored, and that releases the shafts from turning engagement when the frame or case is loosened. Such a transmission drive is disclosed and fully explained in the James B. Pamplin Patent No. 3,192,799 issued July 6, 1965, and which involves broadly, a pair of eccentrically related drive elements. As shown, there is a drive element 27, a driven element 28 and a planetary element 29. These three elements are essentially the only elements required and they operate within a case 31. Additionally, there is a driving element 32 in the case 31, in the nature of a sun gear and in this instance an internal gear. The drive element 27, driven element 28 and driving element 32 are all on a common central axis, the case being a drum shape.

The driving element 32 is in the nature of a sun gear and is in the form of a ring carried by the wall of the case 31. The drive element 27 rotatably enters the case 31 and comprises a drive shaft with an eccentric 33. The driven element 28 rotatably enters the case 31 opposite from the entry of drive element 27 and comprises a driven shaft and a driven sprocket 34 in the nature of an internal ring gear. However, the sprocket 34 is free to turn in the case. The planetary element 29 operates between and has coupled driving engagement with the driving element 32 and driven element 28 and involves a central bearing journaled on the eccentric 33, and involves external gears engaged with the drive element 32 and driven element 28 respectively. Because of the different pitch diameters as clearly indicated in the drawings, the motor drive shaft 27 turns the slide driving shaft 28 at a reduced speed when the case 31 is anchored, and on the contrary has no driving engagement when the case 31 is free to turn.

The motor M is supported on the adaptor B at one end of the circuit breaker housing 15 and disposed on an axis transversely to the motion of the slide S. The transmission drive 25 is supported on the motor shaft which continues into the drive shaft 27. The case 31 is rotatably carried on the said drive shaft in order to carry the driven element 28, the surrounding case being releasably engaged by the clutch 30. A simple clutch 30 is illustrated and which involves a pin 40 that is advanced by a coil 41 so as to engage in an opening in the drum shaped case 31. In practice, there is a plurality of circumferentially spaced openings in the case 31 and the pin 40 is normally retracted by a spring bias. Thus, the case is positively restrained from turning when the ON switch 26 is closed to operate the motor M and to so engage the clutch 30. The driven element 28 is operably coupled to the slide S through a lever and link 42 the said driven element being rotatable through less than 180° movement, or continuously geared, and for example through approximately 90° of movement.

The return means R that is operable to shift the slide S toward the OFF position is preferably a spring bias means involving a spring 45 that is tensioned by movement of the slide S to the ON position. Thus, operation of the drive means D acts to tension the spring 45 when the slide S is driven to the ON position. The spring 45 is shown as a tension spring extended between the slide S and a fixed part of the adaptor B. In accordance with the invention the bias of spring 45 exceeds the bias applied internally of the circuit breaker CB in resisting over-center movement of lever L, so that the return means R is effective to move the lever L over-center and to the OFF position when the slide S is free to so move.

The releasable lock means E holds the slide S in the advance ON position to which it is driven by the drive means D described above. Having reached said ON position it is no longer necessary to operate the motor M and to this end the motor circuit is disconnected automatically by a limit switch 46 operable to open the motor circuit when the fully ON position is reached. As a result of the cooperative arrangement of the motor M and clutch 30, the switch 46 is effective to open and thereby release the slide, whereupon the slide would then return to the OFF position. Therefore, the lock means E is provided so as to retain the slide S in the advanced ON position that it has reached. As shown, the lock means E involves a latch 50 that is advanced by a coil 51 to engage with a stop on the slide S. Thus, the slide S is positively restrained from returning to the OFF position so long as said latch 50 is advanced. In carrying out the invention and so as to release the circuit in the event of power interruption and the like, the latch 50 is spring biased so as to return from the advanced position when the coil 51 is de-energized. Coil 51 is normally energized by a circuit extending between a pair of the power lines (11 and 13). Further, there is an OFF switch 52 in said circuit to the coil 51, being a normally closed switch that can be opened manually so as to open the lock circuit and thereby permit return of the slide S to return to the OFF position. The switch 52 is shown as being incorporated in the motor M circuit, the switch 52 being normally closed push button switches adapted to be opened manually, thereby to open both the motor circuit and the lock circuit.

The control means C is incorporated in the elements above described wherein the motor M and clutch 30 are controlled by the ON switch 26 and wherein the lock pin 50 and its coil 51 is controlled by the condition of the main power circuits and by the OFF switch 52. Thus, the control means C involves but two simple and immediately apparent controlling elements, the ON switch and the OFF switch. Also, the control means C includes the limit switch 46, and all to the end that the motor and coil circuits are directly responsive to the main power circuits which they control and protect. Further, there is the elimination of intermediate power transformers and the avoidance of auxiliary power sources, the actuation of the controls being powered entirely by the voltage and current available from the power lines 11, or 12 and 13.

Having described only a typical preferred form and application of my invention, I do not wish to be limited or restricted to the specific details herein set forth, but wish to reserve to myself any modifications or variations that may appear to those skilled in the art and fall within the scope of the following claims.

Having described my invention, I claim:

1. The combination comprising: an electrical circuit breaker having a lever means operable over-center to one position and returnable over-center from said one position; and an actuator including, a slide engageable with opposite sides of the lever and moving the lever over-center to and from said one position, a return means biased by movement of the slide to said one position, and a releasable lock holding the slide in said one position against the bias of said return means and releasing the slide to drive the lever over-center from said one position.

2. The combination comprising: an electrical circuit breaker having a reciprocable over-center lever means operable to one position; and an actuator including, a shiftable slide engageable with opposite sides of the lever and moving the lever over-center to and from said one position, a motor drive shifting the slide over-center to said one position, a return means biased by shifting of the slide over-center by said motor drive and operably shifting slide and driving the lever over-center from said one position, and a releasable lock holding the slide in said one position and releasing the slide to shift reciprocally from said one position.

3. The combination comprising: an electrical circuit breaker having a reciprocable over-center lever means operable to one position; and an actuator including, a shiftable slide engageable with opposite sides of the lever and moving the lever over-center to and from said one position, a motor drive with a releasable power increasing transmission shifting the slide to said one position, a return means biased by shifting of the slide over-center by said motor drive and operably shifting the slide and driving the lever over-center from said one position, a clutch disengaging the transmission when the slide is in the said one position, and a releasable lock holding the slide in said one position and releasing the slide to shift reciprocally from said one position.

4. The combination comprising: an electrical circuit breaking switch having an over-center resisting lever means that has a snap action to an ON position from an OFF position; and an actuator including, a slide engageable with opposite sides of the lever and moving the lever over-center between said ON and OFF positions, a drive means moving the slide over-center to said ON position, a return means biased by movement of the slide to said ON position, and a releasable lock holding the slide in said ON position against the bias of said return means and releasing the slide and driving the lever over-center from said ON position.

5. The combination comprising: an electrical circuit breaking switch having an over-center resisting lever means that has a snap action to an ON position from an OFF position; and an actuator including, a slide engageable with opposite sides of the lever and moving the lever over-center between said ON and OFF positions, a motor drive with a releasable power increasing transmission shifting the slide to said ON position, a return means biased by movement of the slide to said ON position, a clutch disengaging the transmission when the slide is in said ON position, and a releasable lock holding the slide in said ON position against the bias of said return means and releasing the slide and driving the lever over-center from said ON position.

6. The combination comprising an electrical circuit breaking switch with power contacts actuated by an over-center resisting lever means that has a snap action to an ON position from an OFF position; and an actuator including, a slide engageable with opposite sides of the lever and moving the lever over-center between said ON and OFF positions, a motor drive shifting the slide over-center to said ON position and in a selectively controlled circuit from one of the power contacts, a return means biased by movement of the slide to said ON position, and an electrically energized lock in a circuit from one of the power contacts and holding the slide in said ON position against the bias of said return means and releasing the slide and driving the lever over-center from said ON position.

References Cited
UNITED STATES PATENTS

| | | | |
|---|---|---|---|
| 2,570,438 | 10/1951 | Flagge et al. | 200—78 X |
| 2,792,468 | 5/1957 | Kozilkowski | 200—92 |

BERNARD A. GILHEANY, *Primary Examiner.*

R. N. ENVALL, JR., *Assistant Examiner.*